Aug. 28, 1928.
E. W. MILLER
1,681,994
METHOD OF GENERATING TOOTH FORMS
Filed April 15, 1924
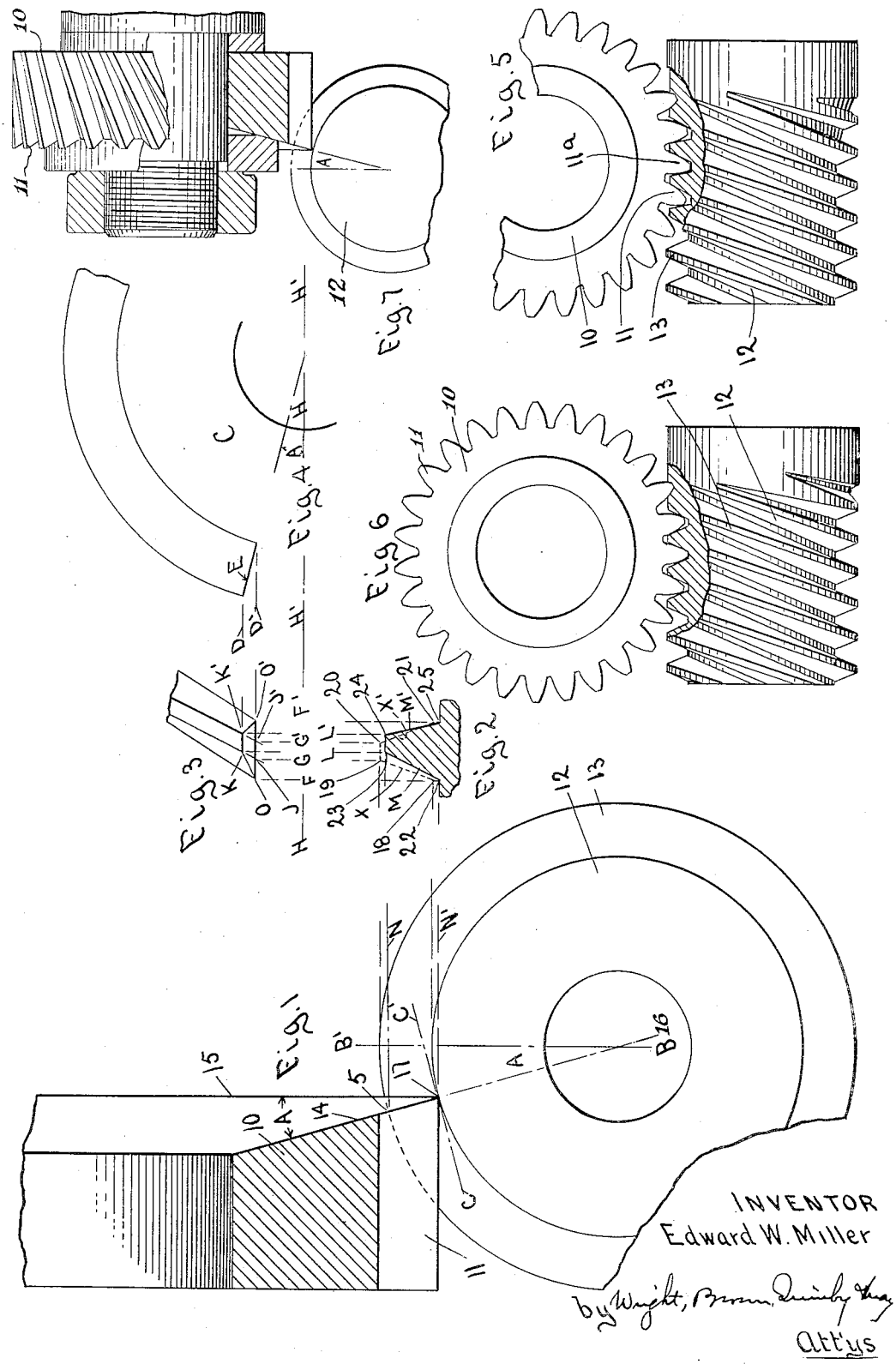
INVENTOR
Edward W. Miller
by Wright, Brown, Quinby & May
Att'ys Patented Aug. 28, 1928.

1,681,994

UNITED STATES PATENT OFFICE.

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT.

METHOD OF GENERATING TOOTH FORMS.

Application filed April 15, 1924. Serial No. 706,661.

This invention relates to the art of cutting threads in worms, screws, and the like, by the use of a cutter capable of generating the desired profile in the thread. My primary object is to furnish for this purpose a milling cutter in the form of a helical gear which not only will remain the same in form after repeated sharpenings, but will require no adjustment as to the distance between its axis and the axis of the work after sharpening, no matter how many times repeated. In other words, my object is to avoid the need of changing the center distance between the cutter and work after sharpening the cutter. This object is accomplished by making the cutter of uniform diameter, and its teeth of uniform thickness, from end to end; and by forming the cutting ends of its teeth with a top rake or bevel. The cutter is designed to form threads of the full depth, or nearly so (when provision is made for a final light finishing cut) in a single pass along the work. Clearance between the cutter teeth and the thread is obtained by setting the cutter with its forward end far enough back from the plane which is both radial to the work and perpendicular to the cutter axis to avoid contact of any part of the cutter teeth, except their cutting edges, with the sides of the thread; and the top rake of the teeth is made of such value that, when the cutter is set in the position stated, the end faces of the teeth in the middle of their arc of action will be approximately radial to the work piece. The cutter teeth are also non-symmetrical.

The invention consists in the cutter indicated in the foregoing general statement and particularly pointed out in the following detailed description and in the claims. It further consists in the new combination of cutter and work above indicated and more particularly pointed out hereinafter. Still further the invention consists in all the novel characteristics of the cutter, not only for the specific purpose above indicated, but for all other purposes to which such cutter may be applicable.

In this specification, and the drawings referred to therein, I have illustrated the embodiment of my invention applied to the specific purpose of cutting the thread of a worm, and I have entitled the cutter as a "thread-generating cutter," but it should be understood that I have not intended by this illustrative explanation to limit the scope of the protection which I claim in any wise short of the full scope in which the novelty and utility of the invention entitles it to protection.

In the drawings associated herewith;

Figure 1 is a sectional view of the cutter and work piece taken through the axis of the cutter.

Figs. 2, 3, and 4 are related views showing the projection, in a plane perpendicular to the cutter axis, of the section of the thread at the cutting plane.

Fig. 5. is a front elevation of the cutter and work piece, the work piece being shown partly in section on the plane in which the cutting edges of the cutter teeth are located, such plane being indicated by the line 15 in Figure 1;

Fig. 6, is a generally similar view, provided for comparison, of a cutter having symmetrical teeth acting on a work piece of which the axis is in the same plane with the operative end of the cutter;

Fig. 7, is a side elevation of my cutter.

Like reference characters designate the same parts wherever they occur in all the figures.

In my Patent No. 1,461,219, granted July 10, 1923, I have disclosed a complete machine for generating threads by the operation of a gear-shaped cutter having helical teeth, the cutter being both traversed along the work and simultaneously rotated. I refer to this patent for two reasons; first to show an operative machine with which my present cutter may be used and, second to illustrate the difference between the new cutter and those heretofore used. On the first point it may be understood without further description that the cutter of the present invention may be mounted on a work spindle, and the latter on a carriage, and given a compound movement of rotation and translation with respect to the rotating work piece, according to the principles and for the reasons as fully explained in said patent.

On the second point, and with reference particularly to Figures 1 and 6 of the present drawings, it will be noted that, whereas previously the helical cutter was arranged with the plane of its cutting end substantially in a plane radial to the work, and its teeth backed off or tapered from the cutting end in order to provide clearance, now according to the present invention, the cutter is made with its diameter uniform and its teeth of the same width and height from end to end, while the object of obtaining clearance between the cutter teeth and the thread cut in the work is obtained by setting the cutter back from the plane, perpendicular to the cutter axis, which passes through the axis of the work.

In these drawings 10 represents the cutter having helical teeth 11, like those of a helical gear, and 12 represents the work piece, that here illustrated being a worm of four parallel threads 13. The cutter is made of material suitable for metal cutting tools. At one end, that which is the forward or cutting end when in use, the cutter is recessed to a conical surface 14, which forms the necessary top-rake and cutting edges at the ends of its teeth. This is the surface which is ground away when the cutter needs sharpening. The elements of this conical surface make an angle A with the plane in which the forward extremities of the cutter teeth lie, such plane being represented by the line 15, and being perpendicular to the axis of the cutter. This plane may be more briefly called the "plane of the forward end of the cutter." The line B—B' in Figure 1 represents the radial plane of the work piece which is perpendicular to the axis of the cutter, and correspondingly is parallel to the plane of the forward end of the cutter. In the machine with which this cutter is used, the cutter and work spindle are transverse to one another at such a distance apart that the cutter teeth will enter the work to the full depth of the thread, less the amount (if any) of the thickness of stock to be left for removal by a finishing cut, and the cutter is placed on its spindle at such a distance back from the plane B—B', that only the edges of its teeth will engage the work piece, and the sides of its teeth back of the cutting edges will not rub on the sides of the thread. The angle A of top-rake of the cutter teeth is preferably made of such value that the end or top faces of the cutter teeth, when in the middle of the arc of action, become approximately radial to the work. Then the radial plane 16—17 of the work piece, including the nearest point of the cutter, makes the same angle A with the plane B—B'. In another mode of statement, when the cutter is set with the top-rake of the tooth which is in mid cutting position radial to the work piece, or approximately so, ample clearance is provided between the cutter teeth and the sides of the thread cut in the work piece.

A more general statement of this relation between the cutter and the work, which applies to the cases of other helically toothed machine elements as well as to worms or screws, may be given on the basis of the following explanation. Assuming that the line C—C' is tangent to the work piece at the point of contact thereof with the extremity of the cutter tooth, and follows the helix angle of the groove cut in the work, this line represents the momentary direction of relative cutting travel between the cutter and work piece. The cutter is inclined or tilted to this line at such an angle that its teeth clear the sides of the groove, and this angle may be, although it is not necessarily in all cases, equal to the angle A which in Figure 1 represents the angle of top-rake. Thus my novel cutter and its relation to the work may be expressed in general terms as being a cutter in the form of a helical gear of uniform diameter operating at an inclination to the direction of relative cutting movement between itself and the work.

I will now describe the nature of the lack of symmetry of the cutter teeth, mentioned in the introductory part of this specification. Such non-symmetry of the cutter teeth is essential for generating symmetrical thread forms because the plane in which the cutting is done is inclined to the axis of the cutter, while the cutter teeth are generated by revolution about the cutter axis and their forms are defined by their intersections with planes perpendicular to said axis. The cutter tooth forms may therefore be most accurately defined in generic terms as corresponding to gear teeth which are conjugate to a rack whereof the teeth correspond to the projection, on a plane perpendicular to the axis of the cutter, of the section of the thread in the cutting plane.

The cutting plane referred to is, in the case illustrated in Fig. 1, the radial plane of the line 16—17 in which the edges of the cutter teeth lie when such teeth are at the middle of their arc of action (the position of the tooth 11$^a$ in Fig. 5). The section of the thread on this plane, being radial to the work piece, is the profile of the thread. This profile is shown by the dotted outline 18—19—20—21 in Fig. 2; while the projection of the profile at the cutting plane upon the plane 15 at the end of the cutter (and upon any other plane perpendicular to the axis of the cutter, as well) is shown by the full line outline 22—23—24—25.

The latter outline is determined by making projections according to the principles of descriptive geometry between Figs. 1 and 2, Figs. 2 and 3, and Figs. 3 and 4. Fig. 4 is an end view of the thread, (as seen from the end of the work) represented a cut off on the plane E, which makes the angle A with a diametrical plane H—H' of the work parallel to the cutter axis. Fig. 3 shows the same part of the thread in side elevation, placed in position to be projected on Fig. 2 by lines perpendicular to the cutter axis. The outline O—K—K'—O' is the projection in Fig. 3 of the thread profile on plane E. Fig. 4, projected along the lines D and D'. J—J' define the line in which the top of the thread intersects a plane, parallel to H—H' and passing through the root of the thread at section E, such plane being represented by the line D'. Owing to the helix angle of the thread, the intersection K—K' of the thread with plane E is offset laterally from the intersection J—J' with plane D'; and the top of the thread at the cutting plane is offset by the same amount from the intersection of the plane 15 with the root of the thread. Hence by projecting the points K, K' on line N (by projection lines L, L') and projecting the points O, O' on line N' (by projection lines F, F'), outline 22—23—24—25 is determined. N and N' are projection lines from the top and root of the thread, respectively, at the cutting plane, running parallel to the cutter axis.

A cutter made with its tooth curves at one side conjugate to a rack of which the tooth-faces have the same inclination to the median line of the tooth as that of the line 24—25 to the median line of the thread profile, and the curves of the opposite sides conjugate to a rack having faces which bear a like relation to the line 22—23, will, when otherwise made as described, and set to cut in a plane making an angle A with the plane B—B', generate and cut threads having the desired profile 18—19—20—21. Since the profiles and projections herein particularly described are composed of approximately straight lines, they correspond substantially to base racks of the involute system of gearing, and the cutter teeth are capable of being generated according to principles well understood in gearing. Hence, by ascertaining the values of the angles which the sides 22—23 and 24—25 respectively make with the median line of the thread profile and then determining the pressure angle and base circle of the conjugate tooth curves, by such principles, it is possible to determine readily and produce accurately the tooth forms necessary to generate a thread of symmetrical profile, or one of any predetermined non-symmetrical profile. Of course the absolute values of the angles made by the lines 22—23 and 24—25 with the median line will vary in different specific cases both according to the helix angle of the thread, and also to the distance to which the cutter is set back from a line corresponding to the line B—B', but the principles underlying the explanation herein given are applicable to all cases.

Figure 5 illustrates graphically the non-symmetrical formation of the cutter teeth and their conjugate relationship to the thread at the cutting plane. The cutter is shown in end elevation in this figure, but the part of the work piece which is represented in section and in engagement with the cutter teeth is the projection of the thread profile projected as explained in connection with Figure 2.

A cutter of the character here described has this great advantage over those in which the sides of the teeth are backed off to give clearance, that no change in the distance between the centers of the cutters and work piece need be made as a result of sharpening the cutter. On the contrary the cutter may be sharpened repeatedly by grinding away its recessed end, as long as there is enough of it left to cut the stock, and it will continue to do satisfactory work. After sharpening, the cutter or its spindle need only be adjusted lengthwise of its axis enough to compensate for the amount of material removed in sharpening, but no adjustment need be made in the position of the spindle itself, and particularly in the distance between the spindle and the axis of the work piece.

It will be apparent from the foregoing explanation that the thread, having in profile the form of a rack tooth, is essentially a gear tooth form.

What I claim and desire to secure by Letters Patent is:

1. The method of generating tooth forms which consists in providing a cutter having the form of a helical gear of uniform diameter and uniform width of tooth from end to end, such cutter having a conically recessed end face and cutting edges at the ends of its teeth, applying such cutter to the work with its axis making an acute angle with the momentary direction of relative cutting travel, rotating the work so as to approach the end of the cutter at the cutting edges thereof, and effecting a relative motion of rolling traverse between the cutter and work lengthwise of the latter.

2. The method of generating threads which consists in providing a cutter having the form of a helical gear of uniform diameter beveled at one end to give top rake to its teeth, applying said cutter to the work piece in a position such that the top rake of the cutter teeth, when in the middle of their arc of action, is approximately radial to the work piece, rotating the work piece toward the cutter, and effecting a relative rolling movement between the cutter and work piece lengthwise of the work piece.

3. The method of generating threads which consists in applying a cutter having helical teeth which throughout their length are equally distant from the axis of the cutter and are non-symmetrical at opposite sides, applying said cutter to the work piece with the ends of the cutter teeth in position to cut the work to a predetermined depth and the plane of the forward end of the cutter set back from and parallel to an axial plane of the work perpendicular to the cutter axis, rotating the work, and rolling the cutter lengthwise of the work in the manner of a gear rolling in mesh with a rack.

4. The method of generating threads which consists in providing a cutter having the characteristics of a helical gear with non-symmetrical opposite tooth faces, which faces are respectively conjugate to the opposite sides of the profile of a symmetrical thread on a plane inclined to the plane of the profile, applying such a cutter in cutting relation to the work with its axis perpendicular to a radial plane of the work and the plane of its forward end displaced to the rear from said radial plane, rotating the work piece in a direction to cause cutting thereof by the cutter, and effecting a relative rolling travel between the cutter and the work.

5. The method of generating threads which consists in providing a cutter having the characteristics of a helical gear of uniform diameter from end to end with a conically beveled forward end face and top rake of its teeth at the cutting ends thereof, forming the opposite faces of the cutter teeth with non-symmetrical face curves which are conjugate respectively to the tooth faces of racks corresponding to the projections of the thread profile on a plane making an angle equal to the angle of top rake with the plane of the thread profile, applying the cutter to the work in position to cut therein to a prescribed depth and in such relation that the end faces of the cutter teeth are approximately radial to the work piece, rotating the work piece in the direction to cause cutting thereof, and producing a relative rolling movement between the cutter and work piece.

In testimony whereof I have affixed my signature.

EDWARD W. MILLER.